United States Patent [19]

Temme

[11] 4,359,154
[45] Nov. 16, 1982

[54] SCRAPER-CHAIN CONVEYORS FOR MINERAL MINING

[75] Inventor: Helmüt Temme, Im Eickel, Fed. Rep. of Germany

[73] Assignee: Gewerkschaft Eisenhutte Westfalia, Lunen, Fed. Rep. of Germany

[21] Appl. No.: 137,123

[22] Filed: Apr. 4, 1980

[30] Foreign Application Priority Data

Apr. 18, 1979 [DE] Fed. Rep. of Germany ...... 2915584

[51] Int. Cl.³ .............................................. B65G 19/28
[52] U.S. Cl. ...................................... 198/735; 299/43
[58] Field of Search ...................... 198/735, 727, 861; 299/34, 43

[56] References Cited

U.S. PATENT DOCUMENTS

| | | | |
|---|---|---|---|
| 2,633,230 | 3/1953 | Duncan | 198/861 |
| 2,818,164 | 12/1957 | Dommann | 198/735 X |
| 2,869,713 | 1/1959 | Duncan | 198/735 X |
| 3,680,682 | 8/1972 | Paul | 198/861 |
| 3,842,966 | 10/1974 | Blumenthal et al. | 198/735 |
| 4,074,804 | 2/1978 | Grundken et al. | 198/735 |

FOREIGN PATENT DOCUMENTS 656580 2/1938 Fed. Rep. of Germany ...... 198/735
1051727 2/1959 Fed. Rep. of Germany ...... 198/861

Primary Examiner—Jeffrey V. Nase
Attorney, Agent, or Firm—Thompson, Birch, Gauthier & Samuels

[57] ABSTRACT

A scraper-chain conveyor comprises a series of pans joined end-to-end and a scraper-chain assembly circulated along the pans in upper and lower runs. Each of the pans is sub-divided into upper and lower sections of especially reinforced construction. The upper section of each pan is composed of shaped side pieces connected by a floor plate while the lower section is composed of smaller side pieces connected to a base plate. The side pieces of both the upper and lower sections combine to form sigma-shaped profiles with upper and lower flanges and inwardly-extending V-shaped intermediate portions. The lower section is built up vertically with side structures overlapping the side pieces of the upper section and bolted connections are established between the side structures and the upper section and with lateral accessories, such as barrier plates and guides. The side pieces of the upper and lower sections define lateral guide passages for the scraper-chain assembly and the guide passages for the lower run of the assembly are defined by both the side pieces of the upper and lower sections.

16 Claims, 3 Drawing Figures

SCRAPER-CHAIN CONVEYORS FOR MINERAL MINING

BACKGROUND TO THE INVENTION

The present invention relates to a scraper-chain conveyor, particularly for use in mineral mining.

As is known, scraper-chain conveyors used to transport mineral ores from underground mine workings are usually constructed from a series of individual channel sections or pans arranged end-to-end and connected together in traction proof manner. A scraper-chain assembly circulates along the pans in upper and lower runs to conveyor mineral in the upper run. The connection between the ends of the pans usually is such as to permit the pans to cant slightly in relation to one another in both horizontal and vertical planes. Each pan is conventionally fabricated from rolled profiled side walls of E or sigma-shape between which a floor plate is welded. V-shaped grooves in the outside of the side walls receive holders which enable attachments such as barrier plates and guides to be detachably fixed to the side walls. It is known, for example, from German patent specification Nos. 833923, 2058807 and UK patent specification No. 677301 to close off the lower run of the conveyor. This prevents the ingress of material—especially when the conveyor is being shifted—and prevents the accumulation of methane in the lower run where methane is present in the mine working. It is also known to sub-divide the individual pans into upper and lower sections; See for example, German patent specification Nos. 573972, 922754, 848029 and page 704 of Glückauf 1977.

In order to produce high performance, it is necessary to strengthen the conveyor pans so that they can withstand the high forces while maintaining proper guidance of the scraper-chain assembly and a winning machine, e.g. plough. Nevertheless, heavy-duty conveyor pans involve greater costs and weight and impose higher demands on the shifting equipment. A general object of the present invention is to provide an improved conveyor construction.

SUMMARY OF THE INVENTION

A conveyor pan for a conveyor constructed in accordance with the present invention is sub-divided into upper and lower separate sections. The upper section has side walls or members joined by a floor plate and the lower section has corresponding side walls or members, preferably joined by a base plate. The side members of the upper and lower sections define lateral guide passages for the upper and lower runs of the scraper-chain assembly. The guide passages can be of trapezoidal or triangular cross-section matching the shape of the end surfaces of the scrapers of the scraper-chain assembly of the conveyor. The lower guide passages are defined by the side members of both the upper and lower sections. Conveniently, the side members of the lower section are reinforced by built-up side structures extending vertically and overlapping the side members of the upper section and conveniently overlapping the side members of both the upper and lower sections. These side structures may engage with a reinforcement bar or the like on the outside of the side members of the upper section and bolts may connect these engaging components together to thereby fix the upper section to the lower section.

Since the guide passages of the conveyor pans of a conveyor made in accordance with the invention are defined by the inwardly-located side members externally reinforced by other structures as described, connection to attachments and between the pans can be effected if desired solely through these other structures. This permits the side members to be relatively light, conventional rolled profiles defining guide passages which are wholly equivalent to the guide passages of conventional conveyor pans. It follows that conventional scraper-chain assemblies can be utilized with conveyors constructed in accordance with the invention as well as with conventional conveyors.

Since the lower guide passages for the lower run of the scraper chain assembly are defined partly by the lower sections and partly by the upper sections of the pans when the upper sections with their floor plates are lifted from the lower sections the lower guide passages and the lower run of the scraper-chain assembly will be open and accessible over the entire width of the conveyor pans. Consequently, maintenance and replacement can be effected without difficulty.

It is preferable to form the side members of the upper sections of the pans with external V-shaped grooves—as with conventional conveyor pan side walls. These external grooves can be then be fitted with holders for the securing of attachments and accessibility can be ensured by making the aforesaid side structures with spaced vertical webs extending between upper and lower longitudinal bars or rails to form grid or ladder-like arrangements. The side structures can be single integral components or multi-part components fabricated by welding. The vertical webs of the side structures can possess recesses open to one side of the associated web and rear pockets behind the recesses can locate the heads of bolts used to secure lateral attachments to the pans. The lower bars of the side structures of the lower pan sections may have a vertical height substantially the same as the side members of these sections. The upper and/or lower bars may be provided with bores for receiving bolts and recesses used to receive bolts to secure lateral attachments to the pans. Location means, such as spigots and bores can be provided between the upper bars of the lower section side structures and the upper section bars to permit the upper section to be located onto the lower section.

It is preferable to interconnect the pans of the conveyor via their lower sections and by means of coupling members fitted into pockets open from the inside of the pans. The side structures of each lower section are preferably provided with projections and complementary recesses at the end regions which locate and connect the pans together, the pockets being formed in the projections and adjacent the complementary recesses. The coupling members can be locked in position by pins or the like engaging in the coupling members and in the end projections. The invention may be understood more readily, and various other aspects and features of the invention may become apparent, from consideration of the following description.

BRIEF DESCRIPTION OF DRAWINGS

An embodiment of the invention will now be described, by way of example only, with reference to the accompanying drawings, wherein.

DESCRIPTION OF PREFERRED EMBODIMENT

Figure 1:
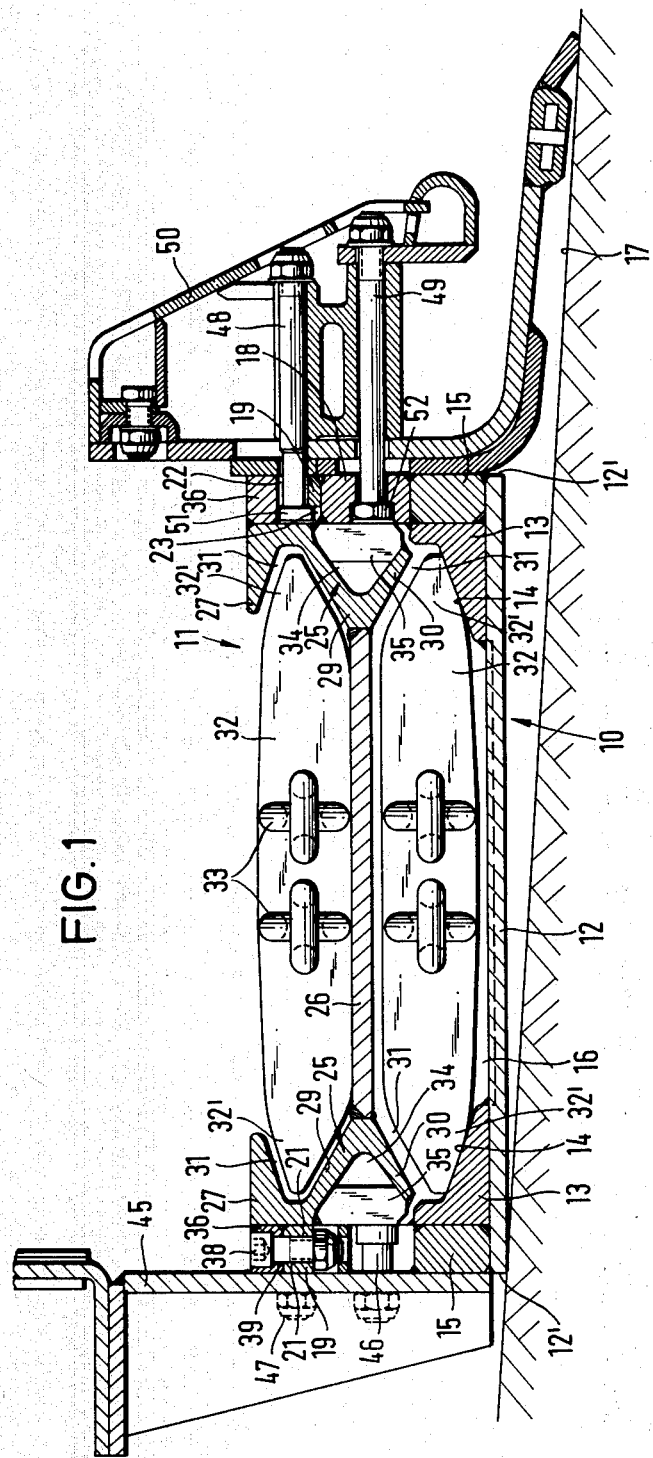
FIG. 1, is a cross-sectional view of a scraper-chain conveyor constructed in accordance with the invention.

As represented in the drawings, a scraper-chain conveyor is composed of individual channel sections or pans arranged end-to-end with lateral attachments including a guide provided at one side for supporting and guiding a winning machine, such as a plough, which is moved back and forth along the guide and the conveyor. Each individual pan is composed of an upper section 11 and a separate lower section 10. A scraper-chain assembly is circulated along the pans in known manner to adopt an upper run moving along the upper sections 11 of the pans and a lower run moving along the lower sections 10 of the pans. The upper section 11 of each pan is detachably and interchangeably connected to the lower section 10 thereof.

The lower section 10 of each pan takes the form of a generally U-shaped trough constructed from a rigid, stable base plate 12 to which shaped side wall members 13 are secured, as by welding. The side wall members 13 of each lower section 10 extend over the entire length of the lower section 10 and have upstanding wall portions and inwardly-extending flanges with upper inclined guide surfaces 14 which serve to guide the lower run 16 of the scraper-chain assembly. The side wall members 13 and the base plates 12 of the lower sections 10 collectively form a guideway enclosing the lower run 16 of the scraper chain assembly. The side members 13 of each lower section 10 are located inwardly of the base plate 12 from the longitudinal side edges 12' of the base plate 12. Bars 15 of rectangular cross-section are located between the outside of the upstanding wall portions of the side members 13 and the side edges 12' of the base plate 12. The bars 15 are welded to the base plate 12 and to the upstanding wall portions of the side members 13. The vertical height of the bars 15 matches that of the upstanding wall portions of the side members 13.

Figure 2:
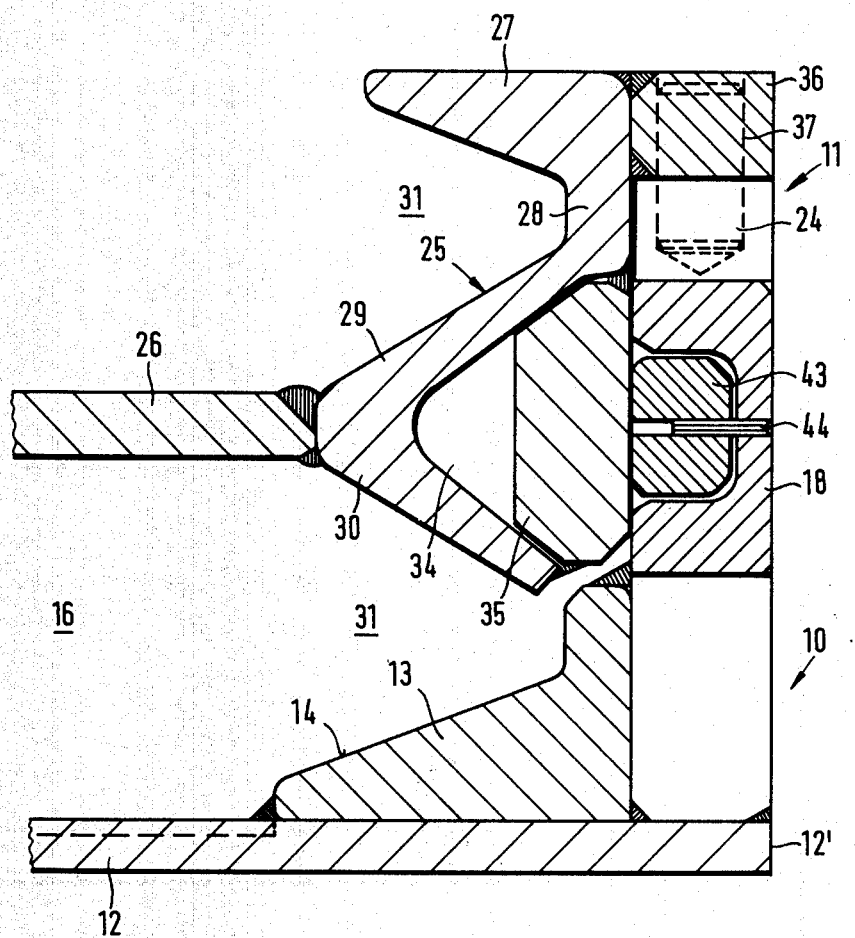
FIG. 2, is a cross-sectional view of part of the conveyor shown in FIG. 1, the view being taken on a somewhat larger scale.
Figure 3:
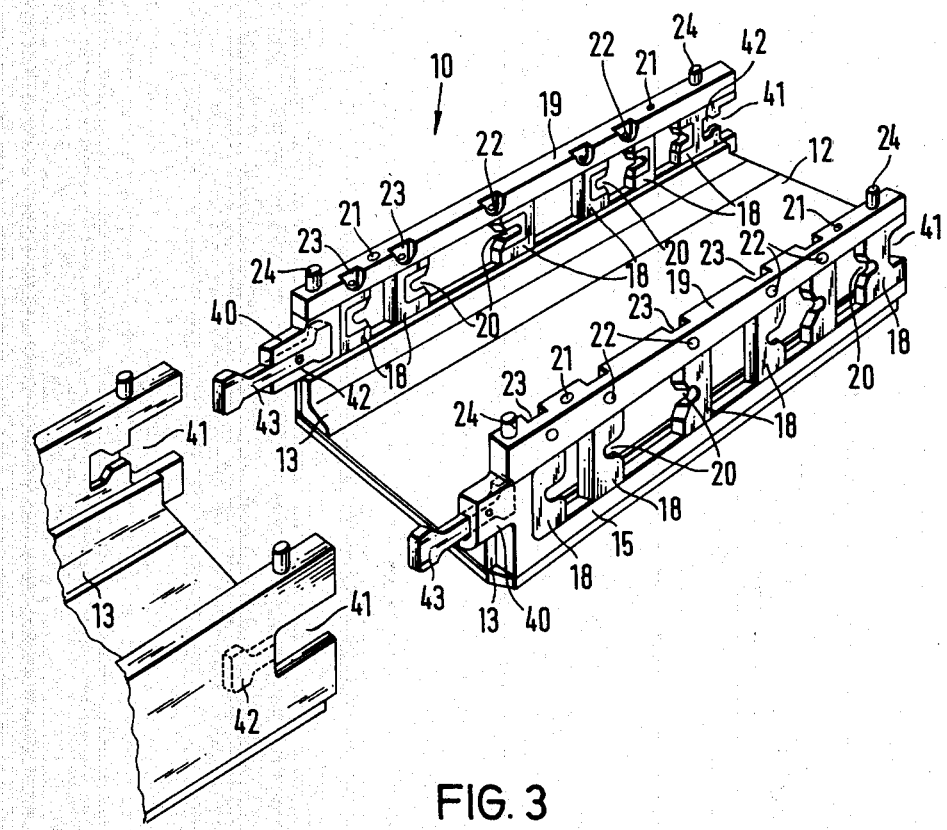
FIG. 3, is a perspective view of a lower section of the conveyor shown in FIGS. 1 and 2.

As shown in FIGS. 2 and 3, the lower bars 15 of each section 10 are connected, via vertical webs 18 spaced apart along the bars 15, with upper bars 19 of rectangular cross-section which extend the entire length of the section 10. The bars 15 and 19 can be welded to the webs 18 to form a rigid side wall structure. It is also possible to fabricate each of the side structures 15, 18, 19 of each lower section 10 as a one-piece casting, instead of the multi-part welded arrangement, as described. It is also possible to integrate the webs 18 with the bars 15 or the bars 19. However constructed, the vertical web 18 at the sides of each lower section 10 are provided with apertures or recesses 20 each opening towards one edge of the associated web 18 as depicted in FIG. 3. As shown in FIG. 3, the top bars 19 of the lower sections 10 are also provided with bores 21 accessible at their upper faces and bores 22 accessible at their external side faces. The bores 21, 22 are distributed over the length of the bars 19. Recesses 23 are provided at the inner corners of the bars 19 and open to the bores 22. Pockets are provided in the webs 18 behind the recesses 20. The recesses 23 and pockets can receive the heads of bolts used to secure spill or barrier plates or the like to the sides of the lower sections 10 of the conveyor pans. Additional recesses can be provided in the lower bars 15 if desired. Upstanding spigots 24 are fixed to the upper faces of the bars 19 of each section 10 at the end regions thereof.

Each upper section 11 takes the form of a generally U-shaped trough composed of complete shaped side wall members 25 fixed, as by welding and as represented, to a conveyor floor plate 26. The side wall members 25 extend over the entire length of the upper sections 11 and are preferably one-piece rolled components. The side members 25 of each section 11 have upper flanges 27 complementary to the flanges of the side members 13 of the lower sections 10. As shown particularly in FIG. 2, each side member 25 has an upright wall portion 28 between its upper flange 27 and a V-shaped portion 29. The shaped portions 29 of the side members 25 of the upper sections 11 define V-shaped grooves 34 at the exterior sides of the conveyor pans and the floor plates 26 are welded between the inside apices of the portions 29. A lower branch or limb 30 of each portion 29 of each side member 25, disposed below the associated floor plate 26, terminates adjacent the upstanding portion of the associated side wall member 13 belonging to the associated lower section 10. The side members 25 of the upper sections 11 of the conveyor pans thus combine with the side members 13 of the lower sections 10 to provide the conventional E or sigma-shaped sides for the pans. The flanges of the side members 13 of the lower sections 10, with their guide surfaces 14, combine with the lower branches 30 of the portions 29 of the side members 25 of the upper sections 11 to form trapezoidal or triangular guide passages 31 for the lower run 16 of the scraper-chain assembly. Similarly, the flanges 27 of the side members 25 together with the upper branches of the portions 29 thereof form trapezoidal or triangular guide passages 31 for the upper run of the scraper-chain assembly. As shown in FIG. 1, the scraper-chain assembly is composed of scrapers 32 fixed to one chain or, as illustrated, a pair of chains 33 arranged at the central region of the conveyor pans. The end surfaces 32' of the scrapers 32 are shaped to correspond with the guide passages 31.

The external V-shaped grooves 34 provided by the side members 25 of the upper sections 11 of the conveyor pans receive holders 35 spaced apart along the pans. The holders 35, usually welded into the grooves 34, serve in known manner to locate barrier or spill plates or other accessories. Bars 36 of rectangular cross-section are welded to the outside of the side members 25 of the upper sections 11 in positions with their upper surfaces flush with the upper surfaces of the flanges 27. The bars 36 of the upper sections 11 engage with the top bars 19 of the lower sections 10. The bars 36 are provided with vertical bores 39 which are alignable with the bores 21 in the bars 19 and vertical bores 37 which can receive the spigots 24 of the bars 19. The upper sections 11 are located to the lower sections 11 by the engagement of the spigots 24 in the bores 37 and the upper sections 11 are detachably fixed to the lower sections 10 with the aid of bolts 38 engaged through the aligned bores 39,21 as shown particularly at the left-hand side of FIG. 1.

Traction-resistant connection means serves to connect together the adjacent conveyor pans each composed of the upper and lower sections 11, 10 as described. As shown particularly in FIG. 3, the connection means employs projections 40 at one end of the lower section 10 of each conveyor pan and corresponding recesses 41 at the other end. Thus, each adjacent pair of connected conveyor pans have the projections 40 engaging in the recesses 41. The projections 40 and recesses 41 can be formed on and in endmost vertical webs 18 of the side structures of the lower sections and/or on and in upstanding continuations of the upper or lower bars 15, 19 or on and in equivalent parts—where the side structures are integral components. FIG. 3 depicts schematically some of these possibilities. The projections 40 and the components formed with the recesses 41 are also provided with shaped pockets 42 open towards the inside of the sections 10. These pockets 42 receive the enlarged heads of correspondingly shaped coupling members 43 resembling dog bones. The coupling members 43 thus secure the ends of adjacent pans together, via their lower sections 10. To lock the coupling members 43 in position, clamping pins 44, (FIGS. 2 and 3) can locate in bores in the members 43 and the outer wall of the projections 40. The inner faces of the projections 40 and the installed members 43 lie flush with the inner surfaces of the side structure of the sections 10 and outside the side members 25 of the sections 11 as shown in FIG. 3. Thus, when assembled, the members 43 are protected inside the more or less continuous sides of the conveyor pans. Normally, the lower sections 10 of the pans would be connected together with the connections means 40, 41, 42, 43 as described prior to the assembly of the upper sections 11 onto the lower sections 10. The upper sections 11 can be easily released from the lower sections 10 for removal by releasing the bolts 38.

As mentioned previously, various attachments can be fitted to the sides of the conveyor pans. By way of examples, FIG. 1, shows a barrier plate 45 and a machine, e.g. plough, guide section 50. The barrier plate 45 is fixed to the goaf or stowage side of one of the conveyor pans by means of sets of bolts 46, 47 offset vertically. The upper bolts 47 locate in the bores 22 of the bars 19 of the lower section 10 goaf side of the pan with their heads positioned in the recesses 23, (FIG. 3) thereof. The lower bolts 46 have their heads locked behind the holders 35 fitted in the V-shaped groove 34 of the upper section 11 goaf side of the pan and/or locate in the recesses 20 in the webs 18 or equivalent of the lower section 10 side. The guide section 50 is fixed to the mineral face side of the conveyor pan with the aid of sets of bolts 48, 49. The upper bolts 48 locate in the bores 22 of the bar 19 of the lower section 10 mineral-face side of the pan with their heads 51 positioned in the recesses 23 thereof. The lower bolts 49, somewhat longer than bolts 48, locate in the recesses 20 in the webs 18, or their equivalent of the lower section 10 side with their heads in the inner pockets thereof and also preferably some of the bolts 49, locate with their heads, behind the holders 35 in the V-shaped groove 34 of the upper section 11 mineral-face side of the pan. It is possible to fix attachments to the lower sections 10 of the conveyor pans prior to the assembly of the upper sections 11. This enables the lower sections 10 with their attachments to be moved as constructional units from site to site and only assembled to the upper sections 11 in situ.

I claim:

1. In a scraper-chain conveyor for use in mineral mining and composed of a series of pans arranged end-to-end along which a scraper-chain assembly is circulated in upper and lower runs, each pan being composed of side walls adjoined by a floor plate, each side wall having a central V-shaped groove in its exterior aligned with said floor plate; the improvement comprising each pan is composed of an upper section detachably secured to a lower section, with the plane of separation between the sections being spaced vertically beneath the floor plate and the V-shaped grooves so that the upper section has shaped side means joined by the floor plate, and the lower section has corresponding upstanding side members, the side members of the upper and lower sections defining upper and lower lateral guide passages for the upper and lower runs of the scraper-chain assembly, the side members of the upper section projecting downwardly from the floor plate whereby the lower guide passages are formed partly by the side members of both the upper and lower sections, the lower section of each pan being provided with side structures which extend vertically upwardly to overlap the side members of the upper section of the pan, the said side structures being provided with shaped pockets at their end regions open to the inside of the lower section and serving to receive coupling members used to connected the pans together.

2. A conveyor according to claim 1, wherein the side members of the upper and lower sections of each pan combine to form sigma-shaped profiles.

3. A conveyor according to claim 2, wherein the side members of the lower section of each pan form the lower flanges of the sigma-shaped profiles.

4. A conveyor according to claim 1, wherein the side members of the lower section of each pan are fixed to a base plate.

5. A conveyor according to claim 1, wherein the side members of the upper sections of the each pan have bars on the exterior sides which engage on the side structures of the lower section.

6. A conveyor according to claim 5, wherein each side structure is composed of upper and lower bars extending longitudinally of the lower section and spaced-apart vertical webs extending between the bars, the upper bars of the side structures of each lower section having bores used to receive bolts which secure the bars of the upper section thereto and wherein location means are provided between the bars of the upper section side members and the upper bars of the side structures to locate the upper section on to lower section of the pan.

7. A conveyor according to claim 6, wherein the location means takes the form of upstanding spigots on the upper bars of the side structures and bores in the bars of the upper section side members.

8. A conveyor according to claim 1, wherein each side structure is composed of upper and lower bars extending longitudinally of the lower section and spaced-apart vertical webs extending between the bars.

9. A conveyor according to claim 8, wherein the webs of each side structure have recesses each open to one side of the associated web, the recesses serving to receive bolts usable to secure attachments to the sides of the pans.

10. A conveyor according to claim 8, wherein the vertical height of the lower bars of the side structures of each pan corresponds to that of the side members of the lower section thereof.

11. A conveyor according to claim 8, wherein the upper bars of each side structure are provided with bores for receiving bolts used to secure the upper section of the pan to the lower section thereof.

12. A conveyor according to claim 11, wherein the upper bars of each side structure are provided with means for location with the upper section of each pan.

13. A conveyor according to claim 8, wherein the upper bars of each side structure are provided with bores and associated recesses open inwardly to the associated pan for receiving bolts used to secure lateral attachments to the pans.

14. A conveyor according to claim 1, wherein the side structures of each lower section are provided with projections and complementary recesses at the end regions which locate and connect the pans together, the pockets being formed in the projections and adjacent the complementary recesses.

15. A conveyor according to claim 1, wherein the external V-shaped grooves of said side walls are adapted to contain holders for the securing of lateral attachments to the pan.

16. A scraper-chain conveyor comprising a series of pans joined end-to-end along which a scraper-chain assembly is circulated in upper and lower runs, each pan being composed of sigma-shaped side walls adjoined by a floor plate, each side wall having a central V-shaped groove in its exterior aligned with the floor plate, each pan being sub-divided into upper and lower sections detachably secured together with the plane of separation between the sections being spaced vertically beneath the floor plate and the V-shaped grooves, the upper section of each pan being composed of shaped side members connected by the floor plate, the lower section of each pan being composed of side members connected by a base plate and side structures which extend vertically upwards to overlap the side members of the upper section wherein the side members of the upper and lower sections define guide passages for the upper and lower runs of the scraper-chain assembly and the side members of the upper section projecting downwardly from the floor plate whereby the lower guide passages are formed partly by both the side members of both the upper and lower sections, the said side structures being provided with shaped pockets at their end regions open to the inside of the lower section and serving to receive coupling members used to connect the pans together.

* * * * *